W. J. GOELZER.
STOCK FEEDER AND WATER FOUNTAIN.
APPLICATION FILED MAR. 23, 1916.
1,222,389.
Patented Apr. 10, 1917.
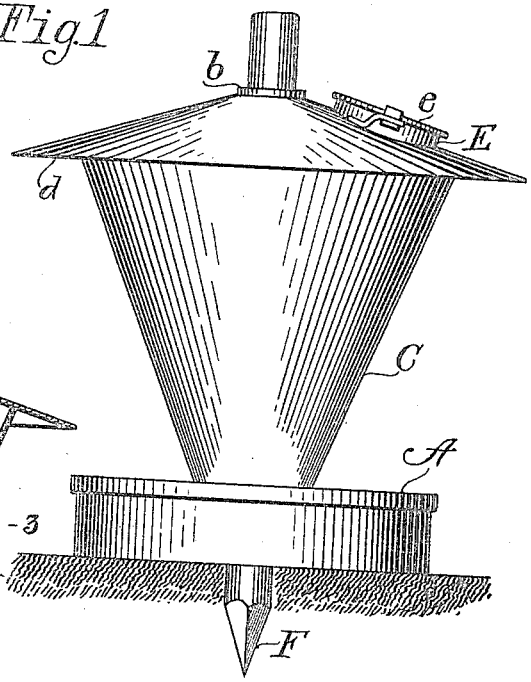
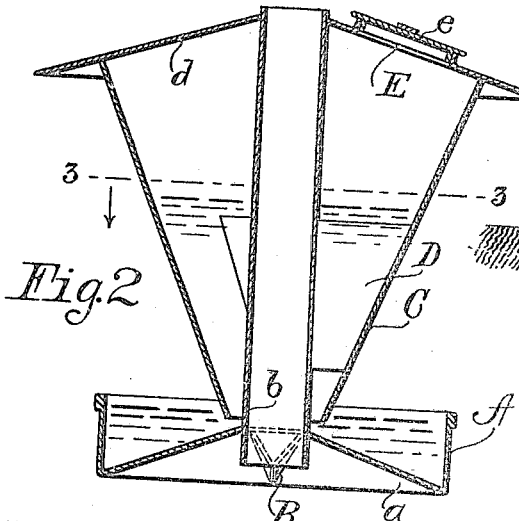
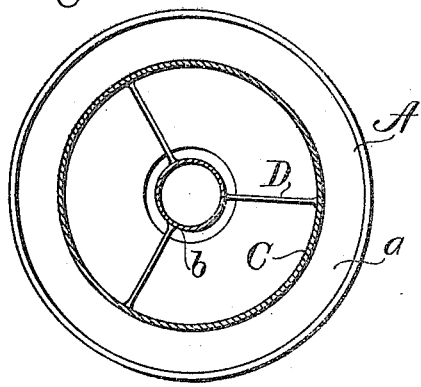
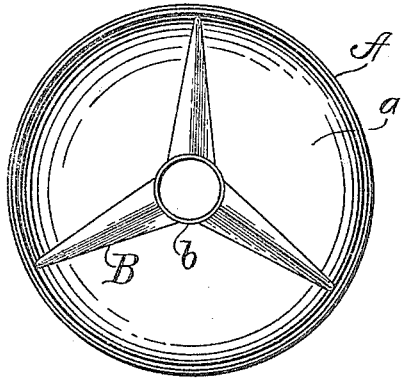
Inventor
Walter J. Goelzer,
By Edwin Guthrie,
Attorney

UNITED STATES PATENT OFFICE.

WALTER J. GOELZER, OF BLOOMINGTON, ILLINOIS, ASSIGNOR OF ONE-HALF TO JOHN H. WOOD, OF BLOOMINGTON, ILLINOIS.

STOCK-FEEDER AND WATER-FOUNTAIN.

1,222,389. Specification of Letters Patent. Patented Apr. 10, 1917.

Application filed March 23, 1916. Serial No. 86,205.

*To all whom it may concern:*

Be it known that I, WALTER J. GOELZER, a citizen of the United States, residing at Bloomington, in the county of McLean and State of Illinois, have invented certain new and useful Improvements in Stock-Feeders and Water-Fountains, of which the following is a specification.

This invention relates to stock feeders and water fountains, and has for its object the production of apparatus for the care of cattle, swine, or poultry, which comprises parts of special construction and particular arrangement with respect to each other, whereby it is believed a magazine or tank structure for watering or feeding animals or fowls may be very cheaply made, within wide limits in regard to size, and especially strong and effective for the purpose intended. It is thought that this invention is equally adapted for construction in relatively large sizes in order that it may be used for watering or feeding large animals such as horses and cattle, that it may be made in a somewhat smaller or intermediate size for the use of swine or sheep, and that it may be made in a still smaller size for the use of poultry. Whatever the size in which this invention may be made, it is believed to be a distinct and considerable advantage to the owner thereof that, no special or prepared foundation or location need be prepared for the reception thereof. It may, whatever its size, be placed upon the ground almost anywhere, and, if necessary, it may be fixed in place by the particular means and construction hereinafter set forth, so that it can not be displaced or pushed about or overturned by the action of the animals using it.

In the accompanying drawings illustrating the construction of the different parts of this invention and their arrangement as a whole, Figure 1 represents an external side view. Fig. 2 is a vertical section. Fig. 3 is a horizontal cross-section on the broken line 3—3 of Fig. 2, looking in the direction of the arrow. Fig. 4 is a bottom view of the pan, showing the special means provided for the support of the central tube upon which the weight of the body and contents are carried to a very large extent.

Throughout the drawings and description, the same letter is employed to refer to the same part.

Considering the drawings, this invention is supported in an upright position upon the ground or other surface by a lower receptacle termed herein the pan A. The pan A has a concave bottom which extends inwardly and upwardly from the lower outer edge of the pan, which edge rests upon the ground or other surface.

Passing upwardly through the bottom of the pan A and through the highest point of the concave bottom $a$, is the central tube $b$, which constitutes the main support for the body of this invention. It will be noted in Fig. 2 that the tube $b$ terminates at a point higher than the lower outer edge of the pan mentioned. In other words, the tube $b$ does not extend entirely down to the ground. It will be understood that the tube is attached to the bottom of the pan by solder, when the size of the invention is small as illustrated, or in some other manner when the size is relatively larger. The concave form of the bottom of the pan affords considerable strength for the purpose of carrying the tube and any weight supported thereby, but, in practice it is customary to reinforce the bottom $a$ by means of triangular, trough-like, tapering ribs B. The form of the ribs B, substantially the form of a cross-section thereof where the rib joins the end of the tube $b$ below the bottom $a$, is illustrated in Fig. 2. This invention is usually made of sheet metal, and the sides of the ribs B grow less in width as shown in Fig. 4 toward the lower outer edge of the pan A. It is found that three ribs of the shape described, taken together with the strength afforded by the concave form of the bottom $a$ of the pan A, afford ample carrying strength for the support of the tube and the parts carried by the tube $b$.

The parts carried by the tube $b$ are the inverted conical body or hollow casing C, which is provided with several brace plates D, soldered or otherwise connected with the interior of the body C, and the tube $b$. The body is thus carried by the tube, and the contents of the body exert their weight also upon the tube to a very considerable extent. The bottom mouth of the body C is larger than the tube $b$ as shown in Figs. 2 and 3.

Near the top of the tube is arranged a low conical cover, roof or lid d, which extends over the upper edge of the body C as shown. The tube passes centrally through the cover d.

The cover d is provided with a throat or opening E, that is provided with a removable closure e, usually made as near airtight as may be, when the invention is intended to hold and serve water.

As has been herein stated, this invention is usually made of sheet metal, and, by reason of the special formation of the parts they may be made of relatively thin metal and still afford the requisite margin of strength necessary for any of the particular uses to which this invention may be devoted. It is an advantage on the score of cheapness in material and in manufacturing. In its smallest form, however, even when charged to its capacity with poultry feed, the whole structure is not heavy, and in order that it may resist displacement by the more or less violent contact with the bodies of the fowls, a stake F may be passed through the central tube b and driven into the ground. In fact, for sheep or swine, the stake may be used to hold this invention in the position desired or selected.

In the operation of this invention as a device for watering animals or fowls, the construction and arrangements of parts is that illustrated in Fig. 2, wherein it will be observed the lower mouth of the body C lies well below the top edge of the pan. If the body be filled with water by removing the closure e and inverting the body in a barrel or other tank, and then replacing the closure, the body may be restored to its normal position and the water will be sustained by atmospheric pressure at some height within the body C, and it will descend and maintain the level in the pan A as it is consumed. When the body C is filled with feed, the feed falls into the pan and outwardly toward the wall of the pan as there is room made for it by the feeding of the animals or fowls.

Having now described this invention, and explained the mode of its operation, what I claim is:—

1. In a stock feeder and water fountain, the combination with a central tube, of a cover arranged near the top of the tube, the said tube passing centrally through the said cover, an inverted conical body arranged below the cover and concentrically with respect to the tube, the said tube passing through the said body, means for supporting the said body on the tube, the said supporting means being arranged within the said body and attached to the said tube, the mouth of the said body at the bottom being larger than the said tube, and a pan arranged below the said body and constructed to rest upon the ground, the said tube passing through the said pan and being connected therewith.

2. In a stock feeder and water fountain, the combination with a central tube, of a hollow body, the said tube passing downwardly through the said body, means for supporting the said body upon the tube, the said body being open around the tube at the bottom of the body, the top of the said body being closed airtight, the said tube passing upwardly through the closed top of the said body and having an airtight junction therewith, a base pan constructed to rest upon the ground and having its sides extending upwardly higher than the open bottom of the said body, the said tube passing downwardly through the said pan and having a watertight junction therewith, and a stake adapted to be driven into the ground and passing through the tube to prevent the fountain from being overturned.

In testimony whereof I affix my signature.

WALTER J. GOELZER.

Copies of this patent may be obtained for five cents each, by addressing the "Commissioner of Patents, Washington, D. C."